(12) United States Patent
Schwerdt

(10) Patent No.: US 6,244,578 B1
(45) Date of Patent: Jun. 12, 2001

(54) SWITCHABLE, HYDRAULICALLY DAMPENING BEARING

(75) Inventor: Hans-Werner Schwerdt, Laudenbach (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/292,709

(22) Filed: Apr. 15, 1999

(30) Foreign Application Priority Data

Apr. 16, 1998 (DE) ............................................ 198 16 763

(51) Int. Cl.⁷ ...................................................... F16F 5/00
(52) U.S. Cl. ...................................... 267/140.13; 267/219
(58) Field of Search .......................... 267/140.11, 140.12, 267/140.13, 219, 140.14, 35; 248/562, 636

(56) References Cited

U.S. PATENT DOCUMENTS

| | | | |
|---|---|---|---|
| 4,660,812 | * 4/1987 | Dan et al. ........................ | 267/140.13 |
| 4,877,225 | * 10/1989 | Noguchi et al. ................. | 267/140.14 |
| 5,180,148 | * 1/1993 | Muramatsu ...................... | 267/140.14 |
| 5,246,212 | * 9/1993 | Funahashi et al. ............. | 267/140.13 |
| 5,344,127 | * 9/1994 | Hettler et al. ................... | 267/140.13 |
| 5,462,261 | * 10/1995 | Eckel et al. ...................... | 267/140.13 |

FOREIGN PATENT DOCUMENTS 41 41 332   6/1993 (DE).

\* cited by examiner

*Primary Examiner*—Robert J Oberleitner
*Assistant Examiner*—Mariano Sy
(74) *Attorney, Agent, or Firm*—Kenyon & Kenyon

(57) ABSTRACT

A switchable, hydraulically damping mount. The mount includes a working space and an equalization space that are filled with damping fluid and are connected in fluid-conveying fashion by way of at least one orifice in a partition wall. The orifice is closable by an actuator of an adjusting apparatus. The actuator has, on the side facing the working space, a variable-volume gaseous medium-filled chamber that is connected to the atmosphere through at least one connecting opening.

14 Claims, 3 Drawing Sheets

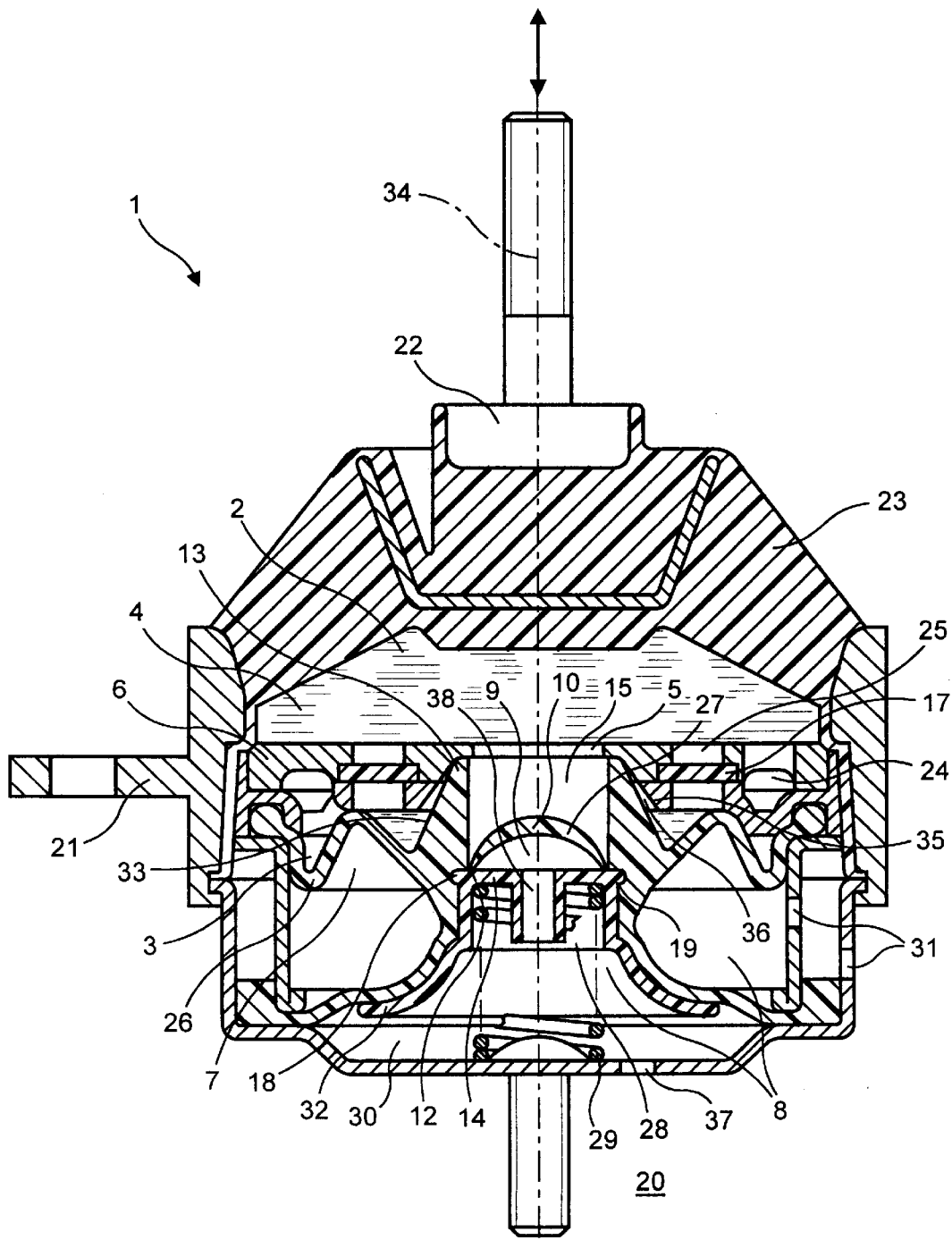
F I G. 3

SWITCHABLE, HYDRAULICALLY DAMPENING BEARING

BACKGROUND INFORMATION

1. Field of the Invention

The invention relates to a switchable hydraulically damping mount.

2. Description of the Prior Art

A mount is known from German Patent 41 41 332 A1. The known mount is configured as a hydro-mount, the actuator being actuable by a pressure medium. The actuator is constituted by a piston which is associated, in gas-tight fashion and movably relative thereto, with a control pressure capsule that is arranged in the housing and can be acted on by pressure medium, the control pressure capsule being delimited by an at least partially elastically flexible first annular membrane which seals off the piston and the control pressure capsule with respect to the housing.

SUMMARY OF THE INVENTION

The object of the present invention is to develop a mount of in such a way as to prevent vibratory excitation of the actuator due to pressure elevations in the working space.

To achieve the objects of the invention, provision is made for the actuator to have, on the side facing the working space, a variable-volume gaseous medium-filled chamber that is connected to the atmosphere through at least one connecting opening. It is advantageous here that on the one hand high-frequency vibrations are effectively isolated, and other hand vibratory excitation of the actuator by pressure elevations in the working space is prevented. In addition, the gaseous medium-filled chamber prevents any rise in the dynamic spring stiffness, which would diminish noise insulation. The connecting opening to the atmosphere has the advantage that no pressure rise takes place in the chamber as the volume is reduced, so that the forces which oppose the forces that are introduced into the mount—and that, in the case of high-frequency vibrations, are naturally small—result only from the deformation stiffness of the chamber wall. It is thus possible, with a correspondingly flexible configuration of the chamber wall, for even the smallest forces introduced into the mount to be eliminated by way of a change in the chamber volume.

The actuator can be actuated by having positive pressure applied to it.

The chamber is delimited by at least one elastically flexible chamber wall configured in the manner of a membrane. High-frequency vibrations introduced into the mount, as well as pressure fluctuations in the working space resulting therefrom, are eliminated in outstanding fashion by the variable-volume chamber with its connecting opening to the atmosphere, while the introduced vibrations are not transferred to the actuator or the housing of the mount, so that the actuator cannot resonate.

The chamber wall is preferably arranged on the side facing toward the working space, and has the form of a corrugated diaphragm. Isolation of high-frequency vibrations is effected by way of the gaseous medium-filled chamber. Secondary contrivances, for example an annular membrane that is arranged inside the partition wall, are therefore superfluous for vibration isolation; as a result, the mount can be manufactured in particularly economical fashion, since no additional components are needed to form the gas-filled chamber.

The corrugated diaphragm is preferably delimited on its periphery by an annular film hinge that is joined to an upward convexity in a dome shape toward the working space. The corrugated diaphragm is configured as a bent spring, the film hinge having the function of a linkage. This guarantees outstanding back-and-forth movability of the upward convexity in the direction of the introduced vibrations.

The chamber can be arranged at least partially axially inside the orifice. It is advantageous here that the pressure fluctuations inside the working space resulting from the introduced vibrations act directly on the elastically flexible chamber wall configured in the manner of a membrane, and are isolated from it. Any transfer of vibrations to the adjusting piston—which also, like the chamber, constitutes a component of the adjusting apparatus that represents a spring-mass system, i.e. an elasticity—is reliably prevented by a configuration of this kind.

The actuator includes a closure plug made of elastomeric material and an adjusting piston, the chamber being enclosed and delimited by the closure plug and the adjusting piston. Any transfer of high-frequency vibrations from the working space to the adjusting piston is prevented by the fact that the gaseous medium-filled chamber, which is connected to the atmosphere through the connecting opening, is arranged between the adjusting piston and the working space. Precise switchability of the mount is thereby ensured, and no resonances, which might result in partial opening of the orifice and would thus negatively influence the damping system, can occur in the adjusting apparatus.

The closure plug can have, on the side facing toward the working space, a cup-shaped recess whose bottom boundary is constituted by the chamber wall. The circumferential boundary of the end face of the closure plug that is open toward the working space touches the partition wall sealingly under elastic preload when the orifice is closed. A further advantage of this embodiment is the fact that the axial movement of the adjusting piston toward the working space is damped by the comparatively high flow resistance of the recess. When the orifice is open, for example when the internal combustion engine supported by the mount is at idle, the mount has an outstanding canceling effect due to the cup-shaped recess.

In order to achieve a further improvement in the isolation of high-frequency vibrations, the partition wall can have an annular membrane that is displaceable in the direction of the introduced vibrations or is retained but deflectable, and that can be acted upon by damping fluid from the working space and equalization space, the chamber wall and the annular membrane being arranged in parallel in terms of functional engineering. The partition wall is preferably constituted by two circular rings which are associated in axial adjacency with one another, the annular membrane being arranged between the circular rings. In the region of the radial overlap of the circular rings and the annular membrane, the circular rings have grid-pattern holes to allow the higher-frequency vibrations to act on the annular membrane. The hydraulically effective surface for isolation of the higher-frequency vibrations is considerably enlarged by the parallel arrangement of the annular membrane and the chamber wall.

The closure plug and the adjusting piston are joined in nonpositive or positive fashion. The adjusting piston can have an annular projection, extending in the radial direction, that is arranged in a corresponding annular recess of the closure plug. The annular projection can, for example, be adhesively bonded into the annular recess.

Preferably, the closure plug and the adjusting piston are adhesively joined to one another by adhesive bonding. It is advantageous in this context that the join is absolutely sealed.

The adjusting piston is preferably made of a polymeric material. It is advantageous in this context that with this material, the adjusting piston is easy to manufacture and has a low mass. The inertia upon actuation of the adjusting piston is therefore low, resulting in exact switchability of the mount.

According to an advantageous embodiment, the orifice is arranged in the center of the partition wall, the orifice, when viewed in cross section, being conically enlarged axially in the direction of the equalization chamber. The advantage of the centrally arranged chamber lies in the fact that the vibrations, upon entering the working chamber, are eliminated over the shortest possible travel. This is particularly true if, according to a particular embodiment, the membrane of the chamber wall extends through the partition wall into the working chamber. As a result of the conical enlargement, when the adjusting apparatus is actuated, a gap of conical profile is formed, the cross section of which continuously increases until it is larger than the orifice inside the partition wall. The ratio between cross section and length continuously changes as the actuator opens, until the upper edge of the closure plug reaches the lower edge of the partition wall. This continuous change in the conduit results in a smooth but rapid and effective switching operation, without resulting in any disruptive pressure drop or any excessive pressure rise because the switching operation proceeds too slowly.

Three exemplary embodiments of the mount according to the present invention are explained in more detail below with reference to FIGS. 1 through 3.

BRIEF DESCRIPTION OF THE DRAWINGS

In the drawings:

FIG. 1 through 3 show three exemplary embodiments of the mount according to the present invention.

DESCRIPTION OF EMBODIMENTS

Figure 1:
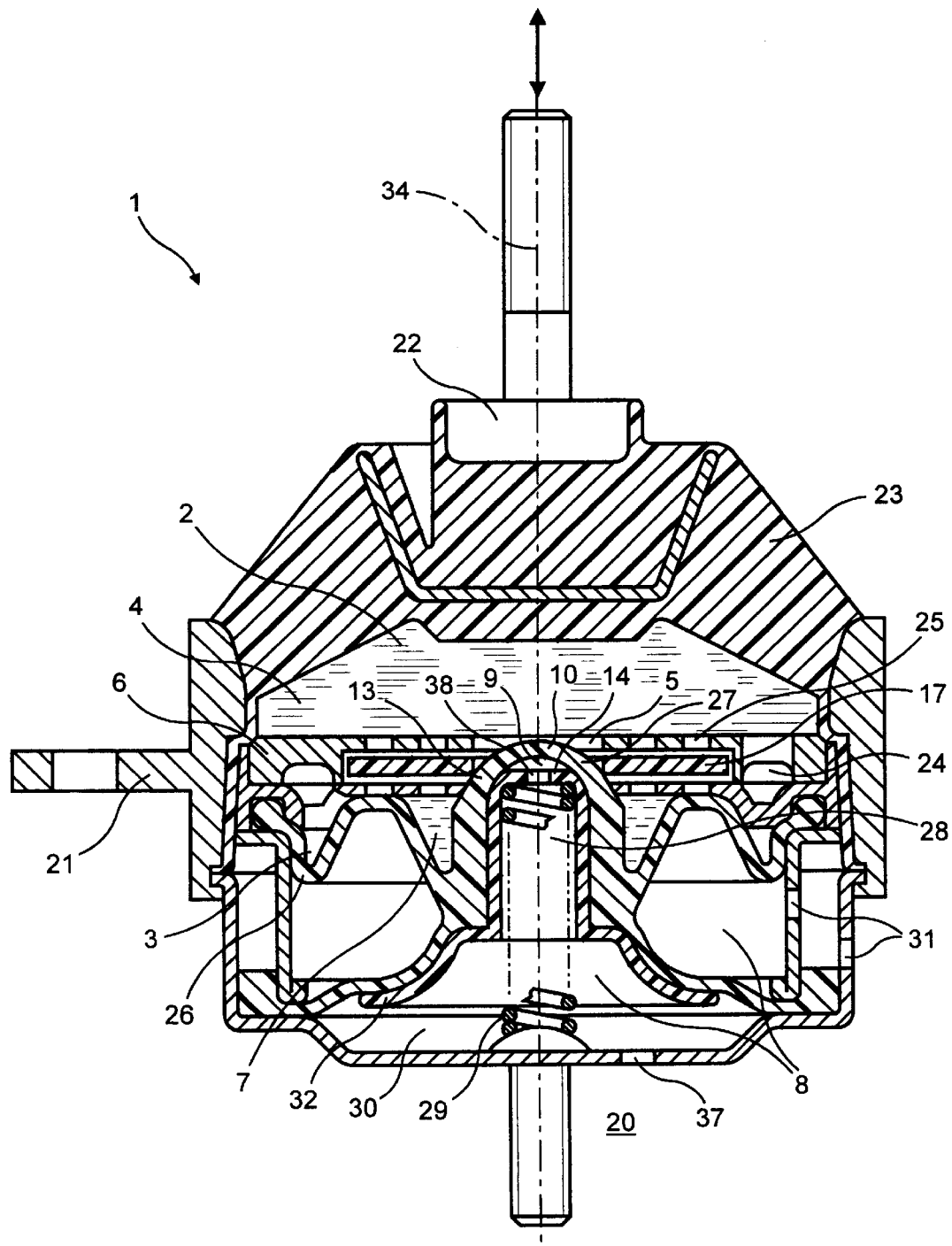
Figure 2:
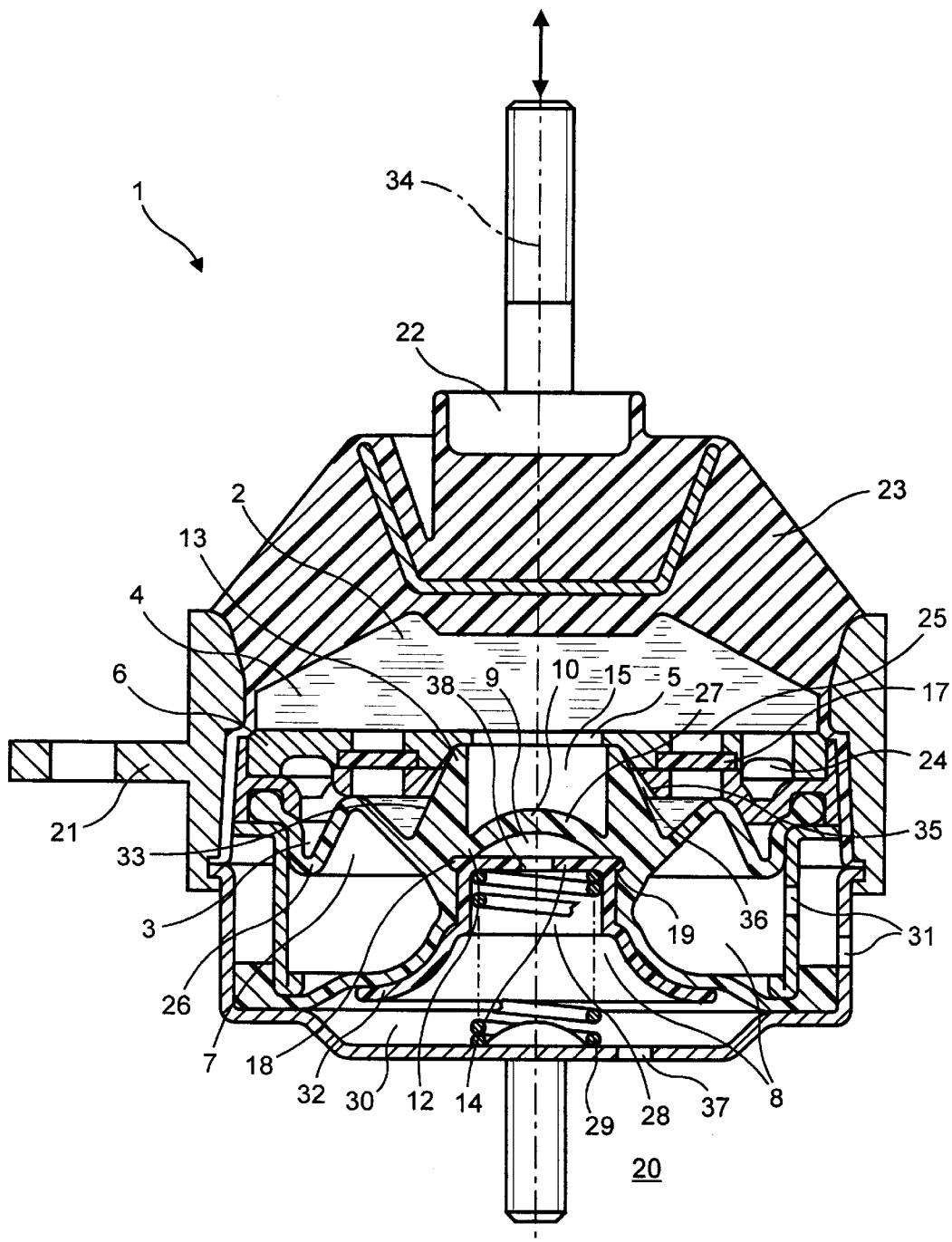

FIGS. 1 through 3 each show an exemplary embodiment of a switchable, hydraulically damping mount that includes a supported mount 21 and a supporting mount 22 that are braced against one another by a hollow conical spring element 23 made of elastomeric material. Working space 2 and equalization space 3 are arranged inside the mount and are each filled with damping fluid 4, working space 2 and equalization space 3 being separated from one another by partition wall 6. In each of the exemplary embodiments, partition wall 6 is configured in two parts, an annular damping conduit 24 that opens on the one hand into working space 2 and on the other hand into equalization space 3 being provided on the external periphery. Partition wall 6 moreover has holes 25, arranged in grid fashion radially inside damping conduit 24, through which annular membrane 17, which is arranged inside partition wall 6, can be acted upon by pressure. Equalization space 3 is equipped, on the side facing away from partition wall 6, with a terminating wall 26 of membrane-like configuration, made of elastomeric material, that receives volume in substantially pressureless fashion.

Orifice 5 is arranged in the center of partition wall 6 and can be closed off by actuator 7 of adjusting apparatus 8. Actuator 7 has, on the side facing toward working space 2, a variable-volume gaseous medium-filled chamber 9, which in the exemplary embodiments shown here is filled with air and is connected through connecting opening 38 to atmosphere 20. Advantageously, the connecting opening 38 is arranged centeredly in a circular shape, and constitutes approximately 10% of the deformable surface area of the chamber wall 10. The length of the connecting opening 38 can be greater than the wall thickness of the adjusting piston 14, thus resulting in a conduit. This yields a canceling effect in the presence of high-frequency vibrations due to nozzle effects.

In each of the exemplary embodiments, chamber 9 is delimited on the side facing toward working space 2 by an elastically flexible chamber wall 10 of membrane-like configuration that is arranged at least partially axially inside orifice 5.

Adjusting apparatus 8 includes an actuator 7, configured as a closure plug 13, made of elastomeric material, and an adjusting piston 14 that is made of polymeric material. Chamber 9 is delimited by closure plug 13 and adjusting piston 14.

In each of the exemplary embodiments shown here, chamber wall 10 and annular membrane 17 are arranged in parallel in terms of functional engineering in order to isolate higher-frequency, acoustically disturbing vibrations.

The following is a description of operation of the mount:

In order to damp low-frequency, large-amplitude vibrations, fluid constituents of the damping fluid are displaced from working space 2 through damping conduit 24 into equalization space 3 and back again, the degree of damping depending on the mass of the fluid oscillating back and forth in damping conduit 24, i.e. on the length of damping conduit 24 and its cross section.

If, on the other hand, higher-frequency, small-amplitude vibrations are introduced into the mount, there is no displacement of fluid from working space 2 into equalization space 3 through damping conduit 24. In this operating state, damping conduit 24 is blocked by the inertia of the fluid constituents present inside the conduit.

Isolation of higher-frequency vibrations is accomplished by the ability of chamber wall 10, and of annular membrane 17 arranged parallel to it, to move back and forth in the direction of the introduced vibrations. If the central orifice 5 is closed off by closure plug 13, the mount according to the present invention has the same advantageous utilization properties as non-switchable hydro-mounts.

At low engine speeds, e.g. at idle, actuation of the adjusting apparatus removes closure plug 13 at least partially out of orifice 5, thus uncovering orifice 5 inside partition wall 6. As a result, the stiffness-enhancing damping of large-amplitude, low-frequency vibrations is deactivated, so that only the compliance of the spring element is effective.

FIG. 1 shows a first exemplary embodiment of the mount according to the present invention. Actuator 7 of adjusting apparatus 8 includes a closure plug 13 made of elastomeric material, and is configured integrally, continuously, and of a uniform material with terminating wall 26 of equalization space 3. Actuator 7 furthermore has a control piston 14 that is made of polymeric material, chamber 9 being enclosed and delimited by closure plug 13 and adjusting piston 14. Chamber wall 10 is constituted by an upward convexity 27 that is bulged in domed fashion toward working space 2. Chamber wall 10 is joined substantially nonpositively to adjusting piston 14, which surrounds the centrally arranged connecting opening 38. Adjusting piston 14 is equipped with an end-surface recess 28 for receiving a compression spring 29 which in normal circumstances, for example when the speeds of a supported internal combustion engine are above idle, closes off orifice 5. Compression spring 29 acts against a positive pressure that can be applied to adjusting apparatus 8 through connector 31.

Cavity 30 is connected to atmosphere 20 through opening 37.

At idle speeds, the adjusting apparatus is actuated by positive pressure.

Adjusting piston 14 is equipped, on the side facing away from working space 2, with a stop 32 of substantially funnel-shaped configuration, in order to prevent excessive elongation of, for example, terminating wall 26 upon actuation of adjusting apparatus 8. The stop serves simultaneously to stiffen the adjacent adjusting membrane.

The exemplary embodiments of FIGS. 2 and 3 differ from the exemplary embodiment of FIG. 1 substantially in that closure plug 13 has, on the side facing toward working space 2, a cup-shaped recess 15 whose bottom boundary is constituted by chamber wall 10. In addition, orifice 5, when viewed in cross section, is enlarged in conical shape axially in the direction of equalization space 3.

In addition, in the exemplary embodiments of FIGS. 2 and 3 adjusting pistons 14 are equipped with an annular projection 18, extending in the radial direction, which is arranged in a corresponding annular recess 19 of closure plug 13 and, in these exemplary embodiments, is adhesively bonded.

The cup-shaped recess 15 inside closure plug 13 is delimited by a conical outer peripheral wall 33 that encloses a smaller angle with longitudinal axis 34 of the mount than does delimiting surface 35 of orifice 5. When adjusting apparatus 8 is actuated, the result is a conically profiled gap 36 whose cross section continuously increases while orifice 5 opens.

As a result of the emergence of closure plug 13 downward out of partition wall 6, simultaneously with the increase in the annular opening cross section due to the conical enlargement in the direction of equalization space 3, the length of the conduit becomes shorter axially in the direction of the introduced vibrations. The ratio between cross section and length changes continuously until the upper edge of closure plug 13 has reached the lower edge of partition wall 6. This continuous change in the ratio between cross section and length results in a smoother, faster, and more effective switching operation as compared to the previously known mounts, without causing a disruptive pressure drop or resulting in an excessive pressure rise. The canceling effect also remains effective in the course of the dynamic stiffness, since the conduit still has sufficient length for that purpose.

The exemplary embodiments according to FIGS. 2 and 3 differ in the configuration of chamber wall 10.

In FIG. 2, chamber wall 10 has a substantially constant material thickness, even in the region of the transition to outer peripheral wall 33. The stiffness of the chamber wall can be determined by the way in which its thickness is embodied.

Chamber wall 10 in FIG. 3, in contrast, is of particularly flexible configuration in the direction of the introduced vibrations. In this exemplary embodiment, the particularly soft chamber wall is achieved by way of a circumferential film hinge 12 that extends annularly in the region of the transition to outer peripheral wall 33, the material thickness of film hinge continuously increasing in the direction of dome-shaped upward convexity 27. A configuration of this kind is provided in particular for the isolation of very high-frequency, very small-amplitude vibrations. The configuration of chamber wall 10 depends on the particular circumstances of the application.

What is claimed is:

1. A switchable, hydraulically damping mount, comprising:

a working space and an equalization space filled with damping fluid;

a partition wall including at least one orifice, the working space and equalization space being connected in fluid-conveying fashion by the at least one orifice;

an adjusting apparatus including an actuator, the orifice being closable by the actuator, the actuator having, on a side facing the working space, a variable-volume gaseous medium-filled chamber, the chamber being connected to the atmosphere through at least one connecting opening, wherein the actuator includes a closure plug made of elastomeric material and an adjusting piston; and wherein the chamber is enclosed and delimited by the closure plug and the adjusting piston.

2. The mount of claim 1, wherein:

the actuator is actuated by the application of positive pressure.

3. The mount of claim 1, wherein:

the chamber is delimited by at least one elastically flexible chamber wall, wherein the chamber wall is a membrane.

4. The mount of claim 3, wherein:

the partition wall has an annular membrane that is displaceable in the direction of introduced vibrations, and wherein the annular membrane can be acted upon by damping fluid from the working space and equalization space; and wherein the chamber wall and the annular membrane are arranged in parallel.

5. The mount of claim 3, wherein:

the chamber wall is on a side of the chamber facing toward the working space, and wherein the chamber wall is a corrugated diaphragm.

6. The mount of claim 5, wherein:

the corrugated diaphragm is delimited on a periphery by an annular film hinge, the film hinge being joined to an upward convexity of the chamber wall forming a dome shape toward the working space.

7. The mount of claim 1, wherein:

the closure plug is arranged at least partially axially inside the orifice.

8. The mount of claim 1, wherein:

the closure plug and the adjusting piston are joined in nonpositive fashion.

9. The mount of claim 1, wherein:

the closure plug and the adjusting piston are joined in positive fashion.

10. The mount of claim 1, wherein:

the closure plug and the adjusting piston are adhesively joined to one another by adhesive bonding.

11. The mount of claim 1, wherein:

the adjusting piston has an annular projection, extending in the radial direction, that is arranged in a corresponding annular recess of the closure plug.

12. The mount of claim 1, wherein:

the adjusting piston is made of a polymeric material.

13. The mount of claim 1, wherein:

the orifice is arranged in a center of the partition wall.

14. The mount of claim 1, wherein:

the orifice, when viewed in cross section, is conically enlarged axially in a direction of the equalization chamber.

* * * * *